UNITED STATES PATENT OFFICE.

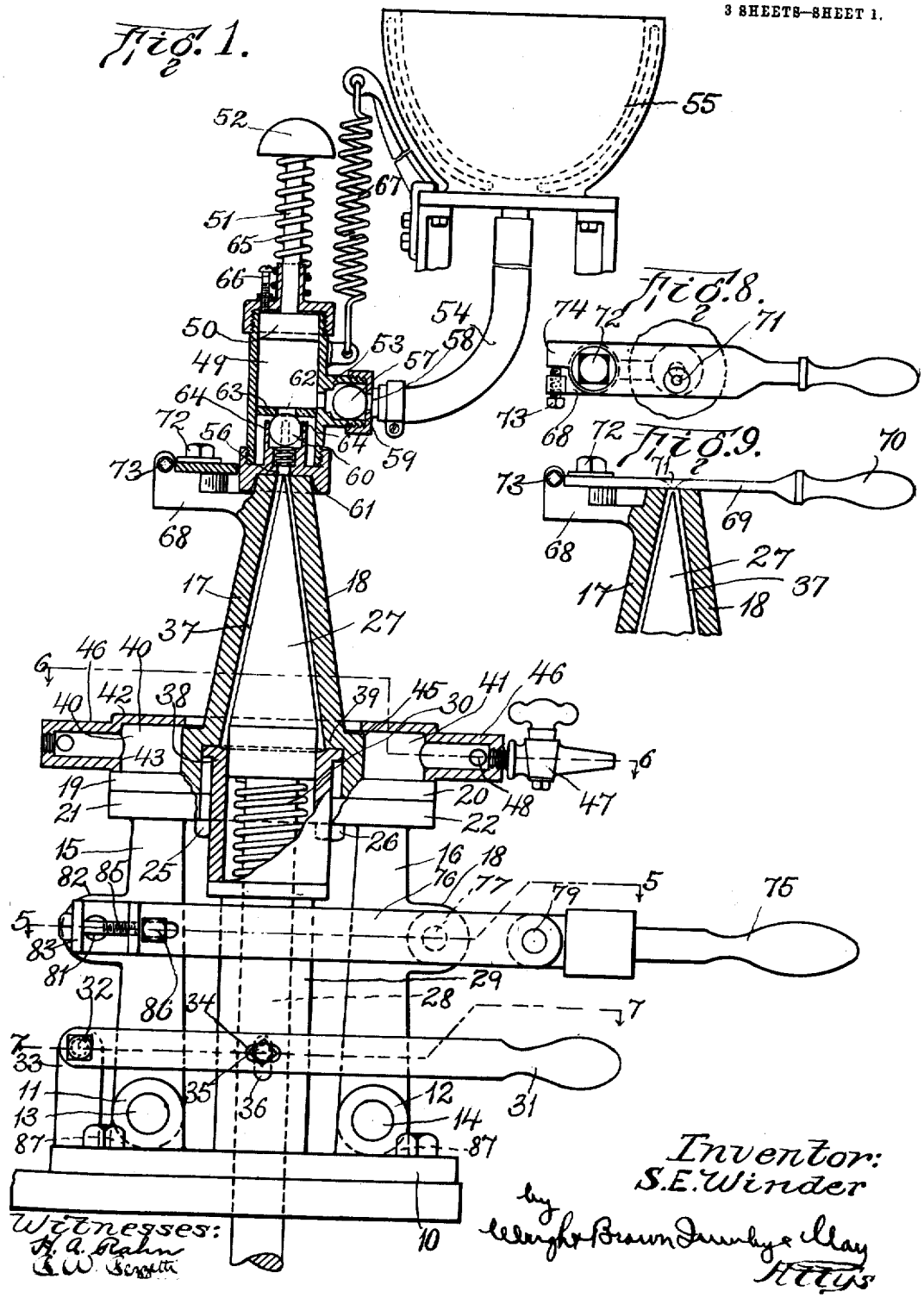

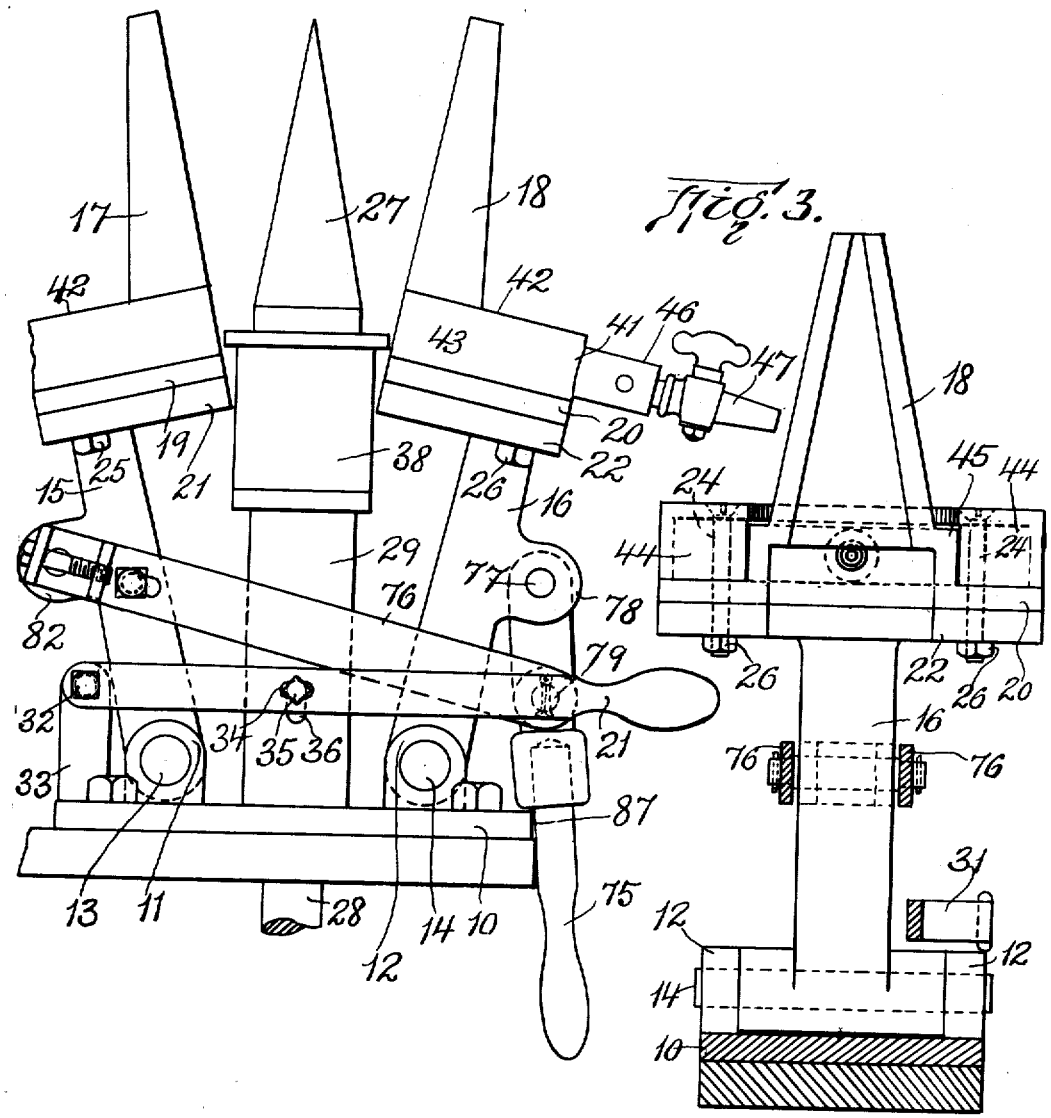

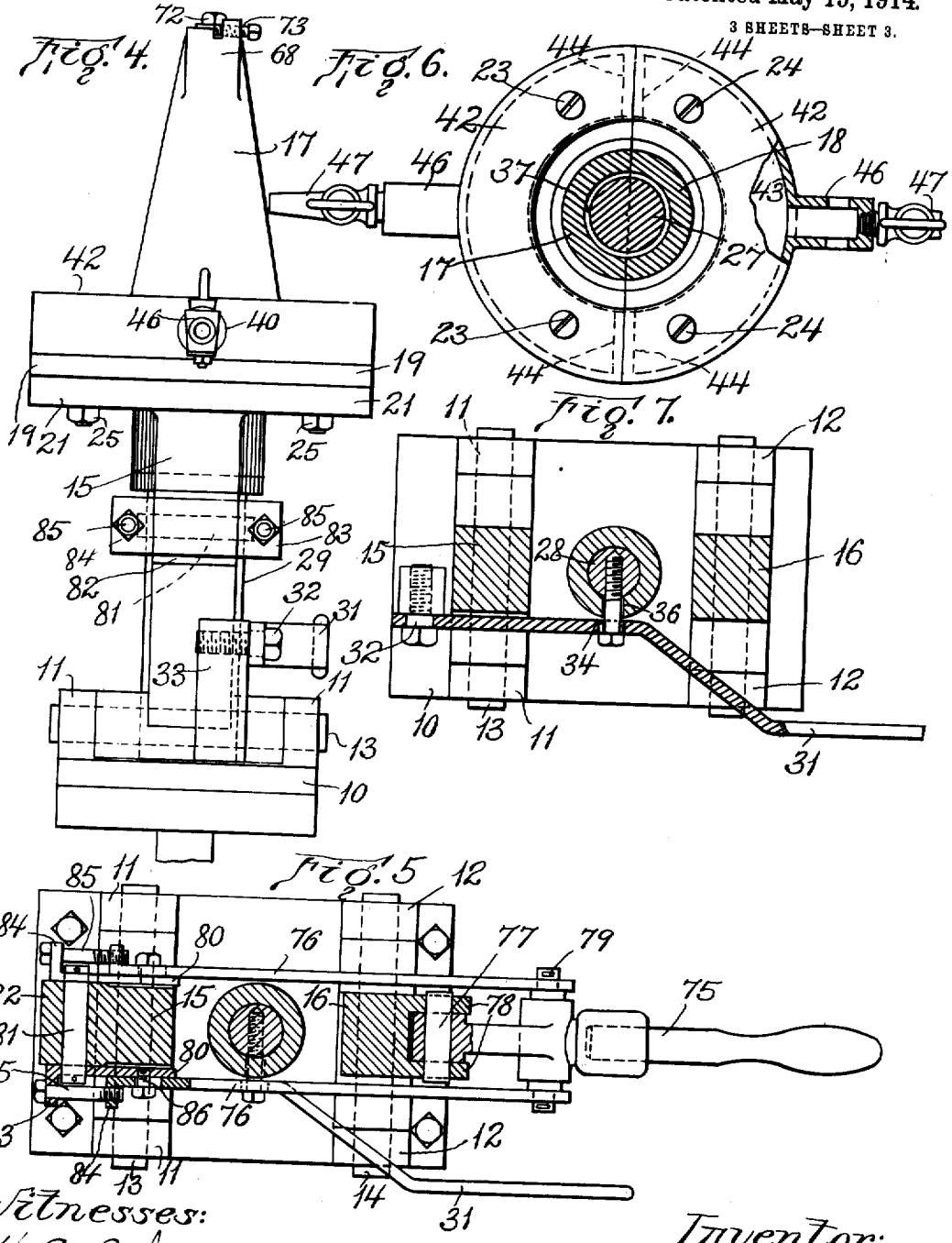

SAMUEL E. WINDER, OF WALTHAM, MASSACHUSETTS, ASSIGNOR TO APPLETON P. WILLIAMS, OF WEST UPTON, MASSACHUSETTS.

METHOD AND APPARATUS FOR BAKING.

1,097,576.   Specification of Letters Patent.   Patented May 19, 1914.

Application filed August 21, 1913. Serial No. 785,965.

*To all whom it may concern:*

Be it known that I, SAMUEL E. WINDER, a citizen of the United States, and resident of Waltham, in the county of Middlesex and State of Massachusetts, have invented certain new and useful Improvements in Methods and Apparatus for Baking, of which the following is a specification.

The object of the present invention is to produce articles made from baked dough, batter, or the like.

Primarily my object is to produce edible baked articles, specifically such as the well known ice cream cones, although the invention is not limited to a methed or means for producing articles of this precise character.

The invention consists in the novel apparatus and in the novel process in which the apparatus is employed, hereinafter particularly described and pointed out in the claims, and in all modifications of such apparatus and process which include and employ the fundamental principles explained in connection with such description.

In the accompanying drawings, Figure 1 is a front elevation partly broken away of one embodiment of the apparatus in which my invention is embodied. Fig. 2 is a view of similar character, but showing the parts of the apparatus in a different position. Fig. 3 is a view in side elevation of one of the halves of the mold which forms a part of the apparatus. Fig. 4 is a side elevation as seen from the left of Fig. 1. Fig. 5 is a sectional plan view of the parts below the line 5—5 of Fig. 1. Fig. 6 is a section on line 6—6 of Fig. 1. Fig. 7 is a section on line 7—7 of Fig. 1. Figs. 8 and 9 are respectively a plan and elevation of the control device which forms an important part of the apparatus.

The same reference characters indicate the same parts in all the figures.

I will first describe the particular apparatus herein illustrated and then describe the method of baking carried out by its use and explain in connection with such description the principles involved in the invention.

In the drawings 10 represents a base on which there are two pairs of lugs 11 and 12 supporting the pivot pins 13 and 14, respectively, of two mold holders having the form of arms 15 and 16, which carry the halves or parts 17 and 18, respectively, of a divided mold by which the desired external form is given to the baked articles. The mold sections have foot pieces or base flanges 19 and 20 which are substantially semi-circular in outline and rest upon similarly formed heads 21 and 22, carried by the arms 15 and 16, to which they are secured by bolts 23, 24 and nuts 25, 26, which also secure gas burners hereinafter described. As the present machine is designed especially for baking the articles known as ice cream cones, the mold members 17 and 18 have a conical form and together constitute a complete whole cone, the internal surface of which has the form intended to be given to the exterior of the product. Within the mold is a core 27 having externally the form of the interior of the baked article. In the present instance the core is conical. Such core, or plug, is mounted upon separating means, which is represented as being a rod 28, passing through a hollow post or tube 29, mounted upon the base 10 between the arms 15 and 16. Normally the plug is held elevated by a spring 30 which surrounds the rod 28 and bears against the bottom of the plug with reaction against a shoulder on the hollow post 29. Said hollow post is also a guide which guides the rod and plug in up and down movements of the latter. The plug may be depressed when desired by a lever 31 which is pivoted at 32 on a post 33 rising from the base 10. Such lever has a longitudinal slot 34 which receives a pin or stud 35 projecting from the rod 28 through a vertical slot 36 in the rod-guiding hollow post 29. When the parts of the mold are brought together and the core or plug is allowed to rise, a narrow space 37 of conical form is left between the mold and plug, as shown in Figs. 1 and 9, in which the dough or batter, or other material to be baked is confined. The bottom of such space 37 is closed by a member 38, which fits closely about the base of the plug 27 and against shoulders 39 in the bottom part of the mold members 17 and 18. The portion of the member 38 which crosses the space between the base of the plug and the shoulders of the mold member defines the edge or rim of the baked article. The member 38 is preferably a sleeve, which rests upon the tubular post 29 and is also a housing for the spring 30.

The mold members support gas burners 40 and 41, which are incomplete semi-circular boxes mounted upon the base flanges of the mold members. Each of these burner boxes consists of an upper plane wall 42, an outer cylindrical wall 43 and transverse end walls 44 or webs, which are approximately in the meeting planes of the mold sections. The gas burners are secured to the mold flanges 19 and 20 by the bolts 23 and 24 previously described and are closed at their under sides by such flanges. Their inner sides are also closed, except for narrow emission slots, by the base portions of the mold members. It will be noted that each mold member has an external shoulder 45, which extends somewhat under the adjacent edge of the top wall 42 of the burner, and between which and such wall is a narrow opening. The gas issues from the burner in a narrow sheet, which completely surrounds the mold, and which when ignited produces a flame directed toward the base of the mold and running along its sides. For admission of the gas each burner has a nipple 46 to which is connected a cock 47 for coupling with a gas pipe and for regulating the supply of gas, and in which are holes 48 for admission of air to secure complete combustion of the gas.

I have provided an apparatus for injecting measured quantities or charges of the batter into the mold. Such device is here shown as a chamber or cylinder 49 in which there is a piston or plunger 50 provided with a stem 51 and a hand piece 52. The measuring cylinder has an inlet 53 in its side connected by a conduit 54 with a container 55, and in its bottom it has an outlet 56 adapted to be placed over the opening in the top of the mold. Valves are provided which cause the piston to draw into the chamber 49 a sufficient quantity of batter to fill the chamber when the piston is raised, and to cause the batter to be expelled into the mold when the piston is depressed. The inlet valve is conveniently a ball 57 which is adapted to close the inlet orifice 58 in a cap 59 which covers the inlet nipple 53 of the measuring device, whenever the internal pressure in the measuring device exceeds the external pressure. The outlet valve is a ball 60, which is raised by a spring 61 so as to close an orifice 62 in a partition 63 in the chamber. A sufficient number of guides 64, between which are openings through which the batter may flow, are provided to hold the ball in line with the orifice 62 and to guide it to a seat on the rim of the orifice. The piston 50 is normally held elevated by a spring 65, and the extent to which it can be elevated is regulated by a set screw 66. Adjustment of the latter determines the volume of the charge which is admitted to the measuring chamber and is thence forced into the mold.

The container or pot 55 for the batter is supported at some convenient point at a level higher than that of the measuring chamber so that the batter will flow readily into the latter. Preferably the container rests upon a table or bracket which may be a part of the machine. It is also preferably water-jacketed or otherwise insulated from heat so that the heat rising from the burner beneath it will not dry its contents so rapidly as to cause them to become too viscous to flow through the conduit 54. The conduit is preferably flexible to allow the measuring device to be removed from over the mold after the latter has been charged, and preferably also the measuring device is supported by a yielding device which will remove it from the mold when the pressure by which the charge is injected into the mold ceases. For this purpose, therefore, the measuring device may be hung from an over-head support by a spring 67, or its equivalent, a counterweighted cord, which will raise the measuring device automatically after having charged the mold. Any other suitable and convenient means for supporting the measuring device so that it may be withdrawn, either automatically or otherwise, from the mold when not being used to charge the mold may be substituted for that illustrated without departing from the spirit of the invention.

A bracket 68 is provided at one side and near the top of the mold on which there is mounted a cover 69 equipped with a handle 70 for moving it. The cover 69 is mounted, either pivotally or otherwise, so that it may be moved across the opening in the top of the mold, and may be removed far enough to uncover such opening when the measuring and charging device is employed to charge the mold. It will have been noted that the mold members are so constructed as not to come together at their upper ends when closed, but to leave an opening of appreciable area. The cover 69 is intended to extend over such opening to confine the contents of the mold during the baking operation. Such cover has a vent 71 so placed that it will register with the mold opening in a certain position of the cover, and may be moved to a greater or less extent out of registry with this opening by manipulation of the cover. The cover here illustrated is pivoted upon a vertical stud 72 and is thus movable angularly in a horizontal plane across the end of the mold. A stop 73 is provided in the bracket 68 and is arranged to abut against a shoulder 74 of the cover. Said stop is adjustable and is so placed as to limit the extent to which the vent opening 71 overlaps the opening in the top of the mold. I have found that this vent is an exceedingly important feature of my invention, as will appear presently from the description of operation and principles.

The mold members 17 and 18 are adapted to be separated, for which purpose their supporting posts or arms 15 and 16 are pivotally mounted on parallel horizontal pivots. For separating and closing the mold members I provide a hand lever 75 and links 76. Said lever is pivoted on a pin 77 between lugs 78 on the arm of post 16, and has trunnions 79 to which the links 76 are pivoted. Said links, which are preferably two in number arranged on opposite sides of the arms 15 and 16 so as to equalize the forces applied through them, are pivotally connected to the arm 15. They are adjustable in length and are constructed as follows: Each link consists of two members, the member to which the numeral 76 is applied and another member 80. The member 80 is pivoted to a pin 81 contained in a lug 82 on the arm 15, and somewhat overlaps the end of the member 76. The two members have lugs 83 and 84, respectively, through which passes an adjusting screw 85 extending lengthwise of the link and adapted to move the member 76 in one direction or the other with respect to the member 80. A clamp screw 86 passes through a longitudinal slot in the member 76 and is threaded into the member 80, serving both to guide the member 76 when being adjusted and to secure it in its adjustments. The lever 75 and links 76 constitute a toggle joint, which when located with its three pivot points in line as shown in Fig. 1, brings the mold members together and holds them so beyond possibility of any force less than sufficient to break some part of the machine to separate them. When the lever 75 is depressed as shown in Fig. 2, the toggle is broken and the mold members are caused to separate. Equality in the separating movements of the two mold members is secured by stop shoulders 87, which are arranged on the outer sides of the arms 15 and 16 to abut against the base 10 when the arms are spread apart. In case either arm should move more freely than the other, it is arrested by its stop before the lever 75 has reached the limit of movement, and thereafter the other arm and mold member are compelled to move by continued movement of the lever. Thus when the mold is open both members are caused to separate from the baked article. When the mold has been opened the plug may be withdrawn by depression of the lever 31, whereupon the baked article is left resting upon its rim on the member 38 and may be readily removed.

In using the apparatus above described to carry out the method of baking, the parts of the mold are first brought together by placing the lever 75 in the position shown in Fig. 1, and the core or plug is raised into the position shown in the same figure. Then the measuring and charging device is placed over the mold and the plunger is operated to inject the batter contained in the chamber 49 into the mold. Then the measuring device is removed, or is released and allowed to be removed from the mold by the spring 67, or whatever other means may be provided for the purpose. The cover 69 is then brought over the opening at the top of the mold so as nearly to cover such opening, leaving the same, however, partly uncovered by the vent orifice 71. Then the flame produced at the gas burner is allowed to play against the mold for a sufficient length of time to bake the batter contained therein. After the baking operation is continued a sufficiently long time, the flame is extinguished or lowered, the mold is opened by depression of the handle 75, and the plug 27 is withdrawn from the baked article as already described, leaving the article where it can be readily removed.

The cover 69 with its vent orifice 71 is an essential element of the apparatus and is necessary to carry out the process. It retains the batter in the mold, preventing it from being expelled by expansion when the heat is applied, thereby causing the batter to fill the mold and make a perfect cone having a closed bottom, while the vent allows the steam and vapors generated in baking to escape and permits the article to be thoroughly baked and dried.

The quantity of batter or dough which is put into the mold is determined by experiment and is sufficient so that when baked it will completely fill the mold. In the raw state, however, it is insufficient to fill the mold, or rather the space between the walls of the mold and the plug. The steam generated by the heating of the mixture contained in the batter during the baking operation, causes the batter or dough to acquire a cellular structure and to expand sufficiently to fill the mold, and particularly to penetrate to the bottom of the mold. The cover 69 or its equivalent, is essential to make the expanding dough expand toward the bottom of the mold. If the opening of the mold were not covered, the batter would be forced by expansion out of the top of the mold and would not penetrate to the bottom thereof, because ordinarily the viscosity of the dough and the drying which commences immediately after it comes in contact with the hot walls of the mold, prevent it from flowing by gravity to the bottom of the mold. The pressure generated by heat, reacting against the closed cover is necessary to force the dough to the bottom of the mold. At the same time the vent opening is necessary to permit gradual escape of the steam and vapor and allow the baked batter to become dry and crisp, since without the vent the moisture would be imprisoned in the mold, and the batter would remain damp and soggy even after prolonged baking.

The essential characteristics of articles such as I produce by my method are crispness, symmetry, and uniformity of size, and it is essential also that they be produced at low cost to meet the demands of commerce. Therefore the time required for baking must not be unduly prolonged. These characteristics are secured by my process and the baking is carried out in the least possible time.

I desire to emphasize that the apparatus which I have shown is shown only for the purpose of illustrating the principles of the invention and not for the purpose of implying that the process must be carried out by this particular means, or that a commercial machine would necessarily be constructed exactly as shown. The elements which I have illustrated constitute one complete molding and baking unit. It is my desire and intention to provide a number of such units in one machine or apparatus and operate such units either simultaneously or successively, so that after each filling and baking operation a large number of articles will be produced. Thus a number of articles may be made in the same time required to produce one such article. While I may provide a distinct charging device for each molding unit, all such charging devices being operated in unison and deriving their supply of material either from a common container or from separate containers, yet I prefer to use one and the same measuring device for a number of molding units, and charge the units successively, controlling the heat so that the batter in units already charged will be baking while other units are being charged. I desire to state also that in describing the cover 69 with its vent 71 as essential to the satisfactory working out of my invention, I do not wish to be understood as saying that this particular cover and vent are essential. What I mean to say is that some form of cover or stop adapted to prevent escape of any appreciable quantity of batter from the mold during baking, and some form of vent which will permit escape of the vapor of moisture contained in the batter are essential, and that it is also desirable that the vent should be adjustable to suit different conditions, although wide variations in the form of cover, vent, and means for adjusting the vent, may be made from those illustrated without departing from the spirit of the invention.

I do not limit the application of the invention to the production of any particular kind of article. Although the particular apparatus and method described have been designed to produce edible ice cream cones, yet I consider that the essential principles of the invention may be applied, with or without modification to the production of other articles which are either molded or baked, or are both molded and baked.

As applied to producing conical baked articles, the invention presents the important novel feature of having the heating flame so arranged as to heat all parts of the mold to the degree necessary for uniformly baking all parts of the article. This feature results from the fact that the mold is arranged with its largest part at the bottom and the heating flame is directed toward the bottom, which contains the greatest volume of material. The natural tendency of heated gas to rise causes the flame and products of combustion to run upward along the mold, heating the entire length of the same. The upper part of the mold which contains less volume of material is located where the temperature of the heating flame is less intense, and this is desirable because less heat is required to bake the narrow end or point of the cone, and there is small chance of overbaking or burning it.

What I claim and desire to secure by Letters Patent is:—

1. A machine for molding and baking hollow articles, comprising a mold conforming to the exterior of the article to be baked and longitudinally divided into separable parts, a core conforming to the interior of such article and permanently located within said mold and between the parts thereof, said mold having an admission opening in its upper part communicating with the space between the core and the sides of the mold, whereby batter may be admitted to such space, and means for applying baking heat externally to the mold.

2. A molding and baking apparatus comprising a longitudinally divided mold having an integral upright conical cavity, a core of generally similar form to that of the cavity arranged within the latter so as to provide a conical annular space between itself and the walls of the cavity, the larger end of such space being closed, and the core being retained between the parts of the mold during charging thereof; the mold being arranged with its smaller end uppermost, and having a charging opening in such smaller end.

3. A machine for molding and baking hollow articles, comprising a mold conforming to the exterior of the article to be baked and longitudinally divided into separable parts, a core located within said mold so as to leave a space between itself and the walls of the mold, and permanently held between the separable parts thereof, said mold having a charging inlet at its highest point opening into such space, whereby the mold may be charged while the core is in place, and a cover arranged movably adjacent to said inlet and adapted to be placed thereover, to confine the batter during baking.

4. An apparatus for baking ice-cream cones and the like, comprising essentially a mold having a substantially conical cavity arranged with its base downward and its apex at the top and having a charging inlet at the apex, a core located within said mold and arranged to define a conical annular space between itself and the walls of the mold cavity, a member underlying and closing the bottom of such space, means for heating the mold, and a cover arranged over said inlet to form an abutment for the expanding batter during baking, said cover being displaceable to uncover the inlet for charging.

5. A molding and baking apparatus comprising a longitudinally divided mold having an internal upright conical cavity, a core of generally similar form to the said cavity arranged within the latter so as to provide a conical annular space between itself and the walls of the cavity, the larger end of such space being closed, and the core being permanently retained between the parts of the mold; the mold being arranged with its smaller end uppermost, and having a charging opening in such smaller end, and a cover adapted to be placed over said opening to prevent escape of the batter in the mold during the ebullition and expansion thereof in baking.

6. A baking apparatus comprising a mold surrounding a confined space and having an inlet at the upper end of such space, a core within such space below said inlet, means for heating the mold, and a cover adapted to be placed over said inlet, and being constructed to leave the inlet partially open.

7. In a baking apparatus, a mold comprising separable members confining a batter receiving space and adapted to be separated to permit the removal of baked articles, a core located within such space and permanently held between said members, said mold having an inlet at its top and being so formed as to permit admission of batter through such inlet when the mold members are closed together, and a cover arranged to extend over said inlet and over the core to prevent escape of batter during the baking operation, said cover being constructed to permit escape of the vapors generated from the batter during baking.

8. In a baking apparatus, a mold comprising separable members confining a batter receiving space and adapted to be separated to permit the removal of baked articles, said mold having an inlet at its top and being so formed as to permit admission of batter through said inlet when the mold members are closed together, and a cover arranged to extend over said inlet to prevent escape of batter during the baking operation, said cover having a vent aperture arranged to overlap the said inlet, to permit escape of vapors.

9. A baking apparatus comprising a mold having an opening in its top and being closed at its bottom, a cover movable across the said opening and having a vent aperture adapted to be placed in registry with the opening, the cover being so movable as either to close the opening entirely or to cause the vent aperture to overlap said opening to a greater or less extent.

10. A baking apparatus comprising a mold having a top opening and being otherwise normally closed, a cover adapted to be placed over said opening and having a vent located to uncover such opening to a greater or less extent according to the position of the cover, and regulating means for determining the extent to which said vent uncovers said opening.

11. In a baking apparatus, a mold comprising separable members confining a batter receiving space and adapted to be separated to permit the removal of baked articles, said mold having an inlet at its top and being so formed as to permit admission of batter through such inlet when the mold members are closed together, and a cover arranged to extend over said inlet to prevent escape of batter during the baking operation, said cover having a vent opening and being movable so as to cause said opening to overlap more or less the mold inlet.

12. In a baking apparatus, a mold comprising separable members confining a batter receiving space and adapted to be separated to permit the removal of baked articles, said mold having an inlet at its top and being so formed as to permit admission of batter through such inlet when the mold members are closed together, and a cover arranged to extend over said inlet to prevent escape of batter during the baking operation, said cover having a vent opening and being movable so as to cause said opening to overlap more or less the mold inlet, and a stop arranged to check movement of the cover when the vent has been brought where it overlaps and uncovers the vent to a predetermined desired extent.

13. A baking device comprising a mold having an external shoulder, a gas chamber extending about the mold and having a lip terminating close to said shoulder, the space between said shoulder and lip forming a gas outlet through which the gas for a heating flame is adapted to flow toward the mold.

14. A baking apparatus comprising a mold having an internal chamber of conical form with its smaller end at the top and being open through the top of the mold, a conical core centrally located within said chamber with its base at the bottom of the mold, a member surrounding the base of said core and located to close the bottom of said chamber, and heating means arranged to apply heat to the mold so as to bake the material charged thereinto.

15. A baking apparatus comprising a mold having an internal chamber of conical form with its smaller end at the top and having a charging opening at the top of the mold, a conical core centrally located within said chamber with its base at the bottom of the mold, a member surrounding the base of said core and located to close the bottom of said chamber, a cover arranged to be placed over the top opening of said chamber and to be removed from such opening, and heating means arranged to apply heat to the mold so as to bake the material charged thereinto.

16. A baking apparatus comprising a mold having an internal chamber of conical form with its smaller end at the top and having a charging opening at the top of the mold, a conical core centrally located within said chamber with its base at the bottom of the mold, a member surrounding the base of said core and located to close the bottom of said chamber, said mold being longitudinally divided on an approximately axial plane, and the parts thereof being separable to permit removal of the contents of the mold, a heating means arranged to apply heat to the mold so as to bake the material charged thereinto.

In testimony whereof I have affixed my signature, in presence of two witnesses.

SAMUEL E. WINDER.

Witnesses:
MARY A. HINES,
J. M. MURPHY.

Correction in Letters Patent No. 1,097,576.

It is hereby certified that Letters Patent No. 1,097,576, granted May 19, 1914, upon the application of Samuel E. Winder, of Waltham, Massachusetts, for an improvement in "Methods and Apparatus for Baking," an error appears in the printed specification requiring correction as follows: Page 4, line 110, for the word "integral" read *internal;* and that the said Letters Patent should be read with this correction therein that the same may conform to the record of the case in the Patent Office.

Signed and sealed this 2nd day of June, A. D., 1914.

[SEAL.]
J. T. NEWTON,
*Acting Commissioner of Patents.*